United States Patent
Coron et al.

(10) Patent No.: US 7,123,717 B1
(45) Date of Patent: Oct. 17, 2006

(54) COUNTERMEASURE METHOD IN AN ELECTRONIC COMPONENT WHICH USES AN RSA-TYPE PUBLIC KEY CRYPTOGRAPHIC ALGORITHM

(75) Inventors: Jean-Sebastien Coron, Paris (FR); Pascal Paillier, Paris (FR)

(73) Assignee: Gemplus, Gemenos (FR)

( * ) Notice: Subject to any disclaimer, the term of this patent is extended or adjusted under 35 U.S.C. 154(b) by 558 days.

(21) Appl. No.: 10/110,315

(22) PCT Filed: Oct. 13, 2000

(86) PCT No.: PCT/FR00/02880

§ 371 (c)(1),
(2), (4) Date: Sep. 20, 2002

(87) PCT Pub. No.: WO01/28153

PCT Pub. Date: Apr. 19, 2001

(30) Foreign Application Priority Data

Oct. 14, 1999 (FR) .................................. 99 12991

(51) Int. Cl.
*H04K 1/00* (2006.01)
*H04L 9/00* (2006.01)
*H04L 9/28* (2006.01)
*G06F 1/26* (2006.01)
*G06F 1/32* (2006.01)

(52) U.S. Cl. ......................... 380/28; 380/29; 380/30; 713/168; 713/252; 713/320; 713/172; 713/173; 713/174

(58) Field of Classification Search ............ 380/28–30; 713/168, 252, 320–340, 172–174
See application file for complete search history.

(56) References Cited

U.S. PATENT DOCUMENTS

| | | | | |
|---|---|---|---|---|
| 5,504,817 A | * | 4/1996 | Shamir | .......................... 380/30 |
| 5,666,419 A | * | 9/1997 | Yamamoto et al. | ............ 380/28 |
| 5,991,415 A | * | 11/1999 | Shamir | ......................... 380/30 |
| 6,304,658 B1 | * | 10/2001 | Kocher et al. | ................. 380/30 |
| 6,396,926 B1 | * | 5/2002 | Takagi et al. | ................... 380/28 |
| 6,480,605 B1 | * | 11/2002 | Uchiyama et al. | ............. 380/30 |
| 6,615,354 B1 | * | 9/2003 | Ohki et al. | .................. 713/193 |
| 6,658,569 B1 | * | 12/2003 | Patarin et al. | ............... 713/194 |
| 6,724,894 B1 | * | 4/2004 | Singer | .......................... 380/28 |

FOREIGN PATENT DOCUMENTS

WO WO98/52319 11/1998

OTHER PUBLICATIONS

Chuan-Kun Wu; Varadharajan, V., Modified Chinese remainder theorem and its application to proxy signatures, Parallel Processing, 1999. Proceedings. 1999 International Workshops on Sep. 21-24, 1999 pp. 146-151.*

Ching-Chao Yang; Chein-Wei Jen; Tian-Sheuan Chang, The IC design of a high speed RSA processor, Circuits and Systems, 1996., IEEE Asia Pacific Conference on Nov. 18-21, 1996 pp. 33-36.*

Freking, W.L.; Parhi, K.K., Montgomery modular multiplication and exponentiation in the residue number system, Conference Record of the Thirty-Third Asilomar Conference on vol. 2, Oct. 24-27, 1999 pp. 1312-131.*

* cited by examiner

*Primary Examiner*—Ayaz Sheikh
*Assistant Examiner*—Shin-Hon Chen
(74) *Attorney, Agent, or Firm*—Buchanan Ingersoll & Rooney PC

(57) ABSTRACT

A countermeasure method in an electronic component which uses an RSA-type public key cryptographic algorithm. A first countermeasure method uses a random calculation for each new execution of the decryption algorithm with CRT. The calculations are made modulo $p*r$ and $q*t$, $r$ and $t$ being random numbers. A second countermeasure makes the recombination random using the CRT theorem.

7 Claims, No Drawings

COUNTERMEASURE METHOD IN AN ELECTRONIC COMPONENT WHICH USES AN RSA-TYPE PUBLIC KEY CRYPTOGRAPHIC ALGORITHM

This disclosure is based upon French Application No. 99/12991, filed on Oct. 14, 1999 and International Application No. PCT/FR00/02880, filed Oct. 13, 2000, the contents of which are incorporated herein by reference.

BACKGROUND OF THE INVENTION

The present invention relates to a countermeasure method in an electronic component which uses an RSA-type public key encryption algorithm.

In the conventional model of secret key cryptography, two people wishing to communicate by means of a non-secure channel must first agree upon a secret encryption key K. The encryption function and the decryption function use the same key K. The drawback of the secret key encryption system is that said system requires the prior communication of the key K between the two people by means of a secure channel, before any encrypted message is sent across the non-secure channel. In practice, it is generally difficult to find a perfectly secure communication channel, especially if the distance separating the two people is large. Secure channel means a channel for which it is impossible to ascertain or modify the information passing across said channel. Such a secure channel can be implemented by a cable linking two terminals, owned by the said two people.

The public key cryptography concept was invented by Whitfield Diffie and Martin Hellman in 1976. Public key cryptography makes it possible to solve the problem of key distribution across a non-secure channel. The principle of public key cryptography consists of using a pair of keys, a public encryption key and a private decryption key. It must be unfeasible by means of calculation to find the private decryption key from the public encryption key. A person A wishing to communicate an item of information to a person B uses the public encryption key of the person B. Only the person B possesses the private key associated with his public key. Only the person B is therefore capable of decrypting the message sent to him.

Another advantage of public key cryptography over secret key cryptography is that public key cryptography allows authentication through the use of electronic signatures.

The first public key encryption scheme implementation was brought out in 1977 by Rivest, Shamir and Adleman, who invented the RSA encryption system. The security of RSA is based on the difficulty of factorising a large number which is the product of two prime numbers. Since then, many public key encryption systems have been proposed, the security of which is based on different calculative problems (this list is not exhaustive):

"Knapsack" by Merckle-Hellman:

This encryption system is based on the difficulty of the subset sum problem;

McEliece:

This encryption system is based on the algebraic coding theory. It is based on the linear code decoding problem;

ElGamal:

This encryption system is based on the difficulty of the discrete logarithm in a finite body;

Elliptical curves:

The elliptical curve encryption system constitutes a modification of existing cryptographic systems in order to apply them to the field of elliptical curves. The advantage of elliptical curve encryption systems is that they require a smaller-sized key than the other encryption systems.

The RSA encryption system is the most used public key encryption system. It can be used as an encryption method or as a signature method. The RSA encryption system is used in smart cards, for certain applications thereof. Possible RSA applications in a smart card are accessing data banks, banking applications, or remote payment applications such as for example pay television, petrol dispensing or payment of motorway tolls.

The principle of the RSA encryption system is as follows. It can be divided into three distinct parts, these being:

1) Generation of the pair of RSA keys;
2) Encryption of a clear message into an encrypted message; and
3) Decryption of an encrypted message into a clear message.

The first part is the generation of the RSA key. Each user creates an RSA public key and a corresponding private key, according to the following method comprising 5 steps:

1) Generation of two distinct prime numbers p and q of the same size;
2) Calculation of n=pq and $\_\!\_$=(p−1) (q−1);
3) Random selection of an integer e, 1<e<$\_\!\_$, such that pgcd(e, $\_\!\_$)=1;
4) Calculation of the unique integer d, 1<d<$\_\!\_$, such that e*d=1 mod $\_\!\_$;;
5) The public key is (n,e); the private key is d or (d,p,q).

The integers e and d are called respectively the encryption exponent and the decryption exponent. The integer n is called the modulus.

The second part of RSA key generation consisting of encryption of a clear message denoted m by means of an algorithm with 1<m<n into an encrypted message denoted c is as follows:

Calculate c=m^e mod n.

The third part of RSA key generation consists of decryption using the private decryption exponent d by means of an algorithm. The algorithm for decryption of an encrypted message denoted c with 1<c<n into a clear message denoted m is as follows:

Calculate m=c^d mod n.

The RSA decryption algorithm described previously can be performed by two different methods. These two methods are: decryption with CRT and decryption without CRT. CRT is an acronym for Chinese Remainder Theorem. The advantage of the decryption algorithm with CRT is that it is theoretically four times faster than the decryption algorithm without CRT.

The decryption algorithm without CRT consists of calculating m=c^d mod n as described previously.

The decryption algorithm with CRT consists of the following four steps:

1) Calculate cp=c modulo p and cq=c modulo q
2) Calculate dp=d modulo p−1 and dq=d modulo q−1
3) Calculate mp=cp^dp modulo p and mq=cq^dq modulo q
4) Calculate m=mp*q*(q^(−1) mod p)+mq*p*(p^(−1) mod q)

For carrying out the modular exponentiations necessary in the calculation methods described previously, a number of algorithms exist:

the algorithm called "square and multiply";
the algorithm with addition chains;

the algorithm with a window;

the algorithm with signed representation.

This list is not exhaustive. The simplest and most used algorithm is the square and multiply algorithm. The square and multiply algorithm takes as inputs a number c, an exponent d and a modulus n. The exponent d is denoted $d=(d(t), d(t-1), d(0))$, where $(d(t), d(t-1), d(0))$ is the binary representation of d, with $d(t)$ the most significant bit and $d(0)$ the least significant bit. For example, the representation of the number five in binary is 101, resulting from the fact that $5=1*2^2+0*2^1+1*2^0$. The first 1 is the most significant bit and the last 1 the least significant bit. The algorithm returns as an output the number $m=c^d \bmod n$.

The square and multiply algorithm has the following three steps:

1) Initialise an integer variable A with the value c;
2) For i from t−1 to 0, do:
2a) Replace A by $A*A \bmod n$;
2b) If $d(i)=1$, replace A by $A*c \bmod n$;
3) Return to step 1 above.

In the case of RSA decryption without CRT, the decryption is performed as described previously using the square and multiply algorithm. In this case, the square and multiply algorithm therefore takes as inputs the encrypted message c, the modulus n and the decryption exponent d.

In the case of RSA decryption with CRT, the decryption is performed as described previously using the square and multiply algorithm twice for the execution of step 3) of the decryption algorithm with CRT. The first time, the algorithm takes as inputs the integer cp, the modulus p and the exponent dp. The second time, the algorithm takes as inputs the integer cq, the modulus q and the exponent dq.

It is possible to perform these operations inside a smart card, said operations being performed by the microprocessor on the smart card. It turned out that the implementation on smart cards of an RSA-type public key encryption algorithm was vulnerable to attacks consisting of a differential current consumption analysis making it possible to find the private decryption key. These attacks are referred to as DPA attacks, DPA being an acronym for Differential Power Analysis. The principle of these DPA attacks is based on the fact that the current consumption of microprocessors executing instructions varies according to the data being manipulated.

In particular, when an instruction is manipulating an item of data in which one particular bit is constant, with the value of the other bits capable of varying, analysis of the current consumption connected with the instruction shows that the mean consumption for the instruction is not the same depending on whether the particular bit takes the value 0 or 1. The DPA type attack therefore makes it possible to obtain additional information on the intermediate data manipulated by the microprocessor on the card during the execution of a cryptographic algorithm. This additional information can in certain cases make it possible to reveal the private parameters of the decryption algorithm, making the cryptographic system non-secure.

In the remainder of this document, two types of DPA attack on the RSA decryption algorithm will be described. The first DPA attack described relates to the RSA decryption algorithm without CRT. The second attack described relates to the RSA decryption algorithm with CRT. These two attacks make it possible to reveal the private decryption exponent d. They therefore seriously compromise the security of the RSA implementation on a smart card.

The first DPA attack relates to the RSA decryption algorithm without CRT. The attack makes it possible to directly reveal the secret exponent d, also called the private key.

The first step of the attack is recording of the current consumption corresponding to execution of the square and multiply algorithm described previously for N distinct encrypted messages $c(1), \ldots c(N)$.

To make the description of the attack clear, a method is first described which makes it possible to obtain the value of the bit $d(t-1)$ of the private key d, or $(d(t), d(t-1), d(0))$, the binary representation of d, with $d(t)$ the most-significant bit and $d(0)$ the least significant bit. Then the description is given of an algorithm which makes it possible to find the value of d.

The messages $c(1)$ to $c(N)$ are grouped according to the value of the least significant bit of $c^4 \bmod n$, where c designates one of the messages $c(1)$ to $c(N)$. The first group consists of the messages c such that the least significant bit of $c^4 \bmod n$ is equal to 1.

The second group consists of the messages c such that said bit is equal to 0. The mean of the current consumptions corresponding to each of the two groups is calculated, and the difference curve between these two means is calculated.

If the bit $d(t-1)$ of d is equal to 0, then the exponentiation algorithm described previously calculates and puts in memory the value of $c^4 \bmod n$. This means that, during execution of the algorithm in a smart card, the microprocessor on the card will actually calculate $c^4 \bmod n$. In this case, in one group of messages the last bit of the data item manipulated by the microprocessor is always equal to 1, and in the other group of messages the last bit of the data item manipulated is always equal to 0. The mean of the current consumptions corresponding to each group is therefore different. A current consumption differential peak therefore appears in the difference curve between the two means.

If on the contrary the bit $d(t-1)$ of d is equal to 1, the exponentiation algorithm described previously does not calculate the value of $c^4 \bmod n$. During execution of the algorithm by the smart card, the microprocessor therefore never manipulates the data item $c^4 \bmod n$. Therefore no consumption differential peak appears.

This method therefore makes it possible to determine the value of the bit $d(t-1)$ of d.

The algorithm described in the following paragraph is a generalisation of the preceding algorithm. It makes it possible to determine the value of the private key d:

The algorithm takes as inputs N messages $c(1)$ to $c(N)$ and the RSA modulus n, and returns as an output an integer h. The steps of the above algorithm are as follows:

1) Put 1 in the variable h,
2) For i from t−1 to 1, execute the following steps:
2)1) Classify the messages $c(1)$ to $c(N)$ into two groups according to the value of the last bit of $c^{(4*h)} \bmod n$;
2)2) Calculate the current consumption mean for each of the two groups;
2)3) Calculate the difference between the two means;
2)4) If the difference reveals a consumption differential peak, calculate $h=h*2$;

Otherwise, execute $h=h*2+1$.

The result of the algorithm is contained in the variable h.

The preceding algorithm supplies an integer h such that $d=2*h$ or $d=2*h+1$. To obtain the value of d, it is then sufficient to test the two possible hypotheses which are $d=2*h$ and $d=2*h+1$. The DPA type attack described therefore makes it possible to find the private key d when the RSA decryption algorithm is performed without CRT.

The second possible DPA attack on the RSA decryption algorithm relates to the application of the decryption algorithm with CRT as described previously.

The attack described is made with chosen messages and focuses solely on the modular reduction operation (step 1) in the description of the decryption algorithm with CRT.

The attack consists of sending correctly chosen messages to the card. The size of the binary representation of p is an integer k. This therefore gives $2^{(k-1)}<p<2^k$. Two cases are then distinguished:

In the first case, $2^{(k-1)}+2^{(k-2)}<p<2^k$.

In the second case, $2^{(k-1)}<p<2^{(k-1)}+2^{(k-2)}$.

The method consists of having the card decrypt a first group A of messages c such that $c<2^{(k-1)}$. The modular reduction of c modulo p therefore gives exactly the integer c as the result. The card is also given for decryption a second group B of messages c such that $2^k<c<2^k+2^{(k-2)}$ in the first case, and $2^{(k-1)}+2^{(k-2)}<c<2^k$ in the second case. In both cases, the modular reduction of c modulo p gives c−p. The card will therefore subsequently manipulate the data item c−p. By analysing the difference in consumption between the messages in the group A for which the result is c and the messages in the group B for which the result is c−p, it is possible by comparison to ascertain all the necessary information making it possible to obtain p.

This paragraph gives the method making it possible to obtain the least significant bit of p. The method is similar for obtaining the other bits of p. The messages in the group A are classified into two categories: a message group A0 for which the last bit of the messages is equal to 0 and a message group A1 for which the last bit is equal to 1. The same operation is carried out for the group B, obtaining the group B0 and the group B1. If the least significant bit of p is equal to 1, the difference in consumption between the groups A0 and B0 will reveal a consumption differential peak since in the group A0 the last bit of the result is equal to 0 and in the group B0 the last bit of the result is equal to 1. If the least significant bit of p is equal to 0, the mean consumption difference between the groups does not reveal any peaks. By means of this method, the least significant bit of p can be determined. By means of a similar method, the bits of p can be successively determined.

DESCRIPTION OF THE INVENTION

The method of the invention consists of developing two countermeasures making it possible to guard against the two types of DPA attack described previously (an attack with CRT and an attack without CRT). The first countermeasure method consists of performing the calculations modulo p*r and q*t, r and t being random numbers. The first countermeasure method constitutes an improvement of an already existing method, presented in patent application WO 99/35782 filed by the company Cryptography Research. In this patent application, a method making it possible to guard against DPA type attacks during the RSA decryption operation is described. The drawback of this method is that it requires the use of integer divisions, operations difficult to carry out inside a portable object of the smart card type. The first countermeasure method comprises only addition and multiplication operations. The second countermeasure consists of making the recombination random using the Chinese Remainder Theorem (CRT).

The first countermeasure method consists of using a random calculation modulus at each new execution of the decryption algorithm with CRT. It consists of performing the calculations modulo p*r and q*t, where r and t are random numbers.

This method takes as inputs a message c, a decryption exponent d and a security parameter s and comprises the following eight steps:

1) Take three random numbers r, t and u between 0 and $2^s$;
2) Calculate p'=p*r and q'=q*t;
3) Replace c by c+u*n;
4) Calculate cp=c modulo p' and cq=c modulo q';
5) Calculate dp=d' modulo p−1 and dq=d' modulo q−1;
6) Calculate mp'=cp^dp modulo p' and mq'=cq^dq modulo q';
7) Calculate m=((mq−mp)*(p^(−1) mod q) mod q')*p+mp;
8) Replace m by m mod n.

The first countermeasure method comprises two variants relating to updating of the integers r and t. The first variant consists in that a new pair of integers r and t is calculated at each new execution of the decryption algorithm, according to the method described previously. The second variant consists in that a counter is incremented at each new execution of the decryption algorithm. When this counter reaches a fixed value T, a new pair of integers r and t is calculated according to the method described previously, and the counter is reset to 0. In practice, T=16 can be taken.

The first countermeasure method comprises a third variant which is useful when the size of the operations, on the integers is limited. This third variant comprises the following steps:

1) Take four random numbers r, t, u and v between 0 and $2^s$;
2) Calculate p'=p*r and q'=q*t;
3) Calculate cp=c modulo p' and cq=c modulo q';
4) Replace cp by cp+u*p and replace cq by cq+v*q;
5) Calculate dp d' modulo p−1 and dq=d' modulo q−1;
6) Calculate mp'=cp^dp modulo p' and mq'=cq^dq modulo q';
7) Calculate m=(((mq−mp)*(p^(−1) mod q) mod q')*p mod n)+mp mod n;
8) Replace m by m mod n.

The first countermeasure method comprises a fourth variant making it possible to increase the security of the operations. In this fourth variant, part of the decryption is carried out modulo p and modulo q using the Chinese Remainder Theorem and part of the decryption is calculated modulo n. The advantage of this fourth variant is arranging that the attacker does not know the output of the recombination using the Chinese Remainder Theorem. This fourth variant comprises the following steps:

1) Take three random numbers r, t and u between 0 and $2^s$;
2) Calculate p'=p*r and q'=q*t;
3) Replace c by c+u*n;
4) Calculate cp=c modulo p' and cq=c modulo q';
5) Calculate dp=d' modulo p−1 and dq=d' modulo q−1;
6) Calculate dp'=(dp−1)/2 and dq'=(dq−1)/2.
7) Calculate mp' cp^dp' modulo p' and mq'=cq^dq' modulo q';
8) Calculate m=((mq−mp)*(p^(−1) mod q) mod q')*p+mp;
9) Replace m by m^2*c mod n.

Thus, as the attacker does not know the output of the recombination using the Chinese Remainder Theorem corresponding to step 7, the attacker cannot carry out a DPA attack on the recombination using the Chinese Remainder Theorem.

The second countermeasure consists of making the recombination random using the Chinese Remainder Theorem. The random nature is due to the use of random calculation moduli. This countermeasure consists of replacing steps 7 and 8 of the first countermeasure method by the following steps. The length (in bits) of the integer p' is denoted k.

a) Choose two random integers (a0, b0) such that b0=a0−1, the integers a0 and b0 being k bits in size;

b) Calculate the integer C=(mq−mp)*(p^(−1) mod q) mod q';

c) Calculate (c mod a0)=(C*p+cp) mod a0 and (c mod b0)=(C*p+cp) mod b0;

d) Calculate two random integers (a1, b1) such that b1=a1−1, the integers a1 and b1 being k bits in size;

e) Calculate C=((c mod b0)−(c mod a0)) mod b0;

f) Calculate (c mod a1)=(C*a0+(c mod a0)) mod a1 and (c mod b1)=(C*a0+(c mod a0)) mod b1;

g) Repeat steps e and f for a new pair (a2, b2) with b2=a2−1, the integers a2 and b2 being k bits in size. The integers (a0, b0) and (a1, b1) are replaced respectively by the integers (a1, b1) and (a2, b2);

h) Step g is repeated k times, k being an integer parameter;

i) Step g is repeated for the pair of integers (a, b)=(2^k, 2^k−1);

j) Calculate the integer c1 defined by c1=c mod 2^k and calculate the integer ch defined by ch=((c mod 2^k−1)−(c mod 2^k)) mod 2^k−1;

k) Calculate the signature c=ch*2^k+c1.

Application of the two preceding countermeasure methods makes it possible to protect the decryption algorithm on smart cards against DPA type attacks. The two countermeasures presented are furthermore compatible with one another: it is possible to apply to the RSA decryption algorithm one or two of the countermeasures described, as well as the four variants of the first countermeasure.

The invention claimed is:

1. A method for decrypting an encrypted message in electronic microprocessors in conjunction with a terminal, making it possible to not disclose information relating to secret data through current consumption of the microprocessor executing the instructions of a program that performs a random calculation modulus at each new execution of an RSA decryption algorithm using the Chinese Remainder Theorem, said method using as inputs a message c, a decryption exponent d and a security parameter s, to generate a decrypted message m, comprising the following steps:

1) Select three random numbers r, t and u between 0 and 2^s;

2) Calculate p'=p*r and q'=q*t, p and q being two distinct prime numbers of the same size;

3) Replace c by c+u*n, where n is the calculation modulus;

4) Calculate cp=c modulo p' and cq=c modulo q';

5) Calculate dp=d' modulo p−1 and dq=d' modulo q−1;

6) Calculate mp'=cp^dp modulo p' and mq'=cq^dq modulo q';

7) Calculate m=((mq−mp)*(p^(−1) mod q) mod q')*p+mp;

8) Replace m by m mod n to thereby generate the decrypted message.

2. A method according to claim 1, further including the steps of incrementing a counter T with initial value 0 at each new execution of the algorithm, keeping the integers r and t the same value until the counter T has reached a fixed limit L, and determining a new pair of integers r and t when this limit is reached.

3. A method according to claim 1 making it possible to protect decryption using the Chinese Remainder Theorem, wherein the decryption calculation formulated by the equation $$m=c^d \bmod n$$

is first performed modulo p and modulo q, the result of the calculation modulo p and modulo q is collected together using the Chinese Remainder Theorem, and the calculation is continued modulo the modulus n.

4. A method according to claim 1, comprising the following nine steps:

1) Select three random numbers r, t and u between 0 and 2^s;

2) Calculate p'=p*r and q'=q*t;

3) Replace c by c+u*n;

4) Calculate cp=c modulo p' and cq=c modulo q';

5) Calculate dp=d' modulo p−1 and dq=d' modulo q−1;

6) Calculate dp'=(dp−1)/2 and dq'=(dq−1)/2;

7) Calculate mp'=cp^dp' modulo p' and mq'=cq^dq' modulo q';

8) Calculate m=((mq−mp)*(p^(−1) mod q) mod q')*p+mp;

9) Replace m by m^2*c mod n.

5. A method according to claim 4 making it possible to protect decryption using the Chinese Remainder Theorem, wherein the decryption calculation $$m=c^d \bmod n$$

is first performed modulo p and modulo q, the result of the calculation modulo p and modulo q is collected together using the Chinese Remainder Theorem, and the calculation is continued modulo the modulus n.

6. A method according to claim 1 further including the step of making the calculation mode random at each new execution of the decryption algorithm using the Chinese Remainder Theorem, said method comprising replacing steps 7 and 8 of the method by the following steps, wherein the size (in bits) of the integer p' is denoted k:

a) Choose two random integers (a0, b0) such that b0=a0−1, the integers a0 and b0 being k bits in size;

b) Calculate the integer C=(mq−mp)*(p^(−1) mod q) mod q';

c) Calculate (c mod a0)=(C*p+cp) mod a0 and (c mod b0)=(C*p+cp) mod b0;

d) Calculate two random integers (a1, b1) such that b1=a1−1, the integers a1 and b1 being k bits in size;

e) Calculate C=((c mod b0) B (c mod a0)) mod b0;

f) Calculate (c mod a1)=(C*a0+(c mod a0)) mod a1 and (c mod b1)=(C*a0+(c mod a0)) mod b1;

g) Repeat steps 5 and 6 for a new pair (a2, b2) with b2=a2−1, the integers a2 and b2 being k bits in size, the integers (a0, b0) and (a1, b1) being replaced respectively by the integers (a1, b1) and (a2, b2);

h) Repeat Step 7 k times, k being an integer parameter;

i) Repeat Step 7 for the pair of integers (a, b)=(2^k, 2^k−1);

j) Calculate the integer c1=c mod 2^k and calculate the integer ch=((c mod 2^k−1)−(c mod 2^k)) mod 2^k−1;

k) Calculate the signature c=ch*2^k+c1.

7. A smart card comprising a microprocessor, said microprocessor executing a program to generate a decrypted message m from inputs including an encrypted message c, a decryption exponent d and a security parameter s, comprising the following steps:

1) Select three random numbers r, t and u between 0 and $2^s$;
2) Calculate p'=p*r and q'=q*t, p and q being two distinct prime numbers of the same size;
3) Replace c by c+u*n, where n is the calculation modulus;
4) Calculate cp=c modulo p' and cq=c modulo q';
5) Calculate dp=d' modulo p−1 and dq=d' modulo q−1;
6) Calculate mp'=cp^dp modulo p' and mq'=cq^dq modulo q';
7) Calculate m=((mq−mp)*(p^(−1) mod q') mod q')*p+mp;
8) Replace m by m mod n.

* * * * *